Dec. 12, 1967 ISUKE SATO 3,357,650

TAPE RECORDER OPERATING DEVICE

Filed Oct. 18, 1965 2 Sheets-Sheet 1

United States Patent Office 3,357,650
Patented Dec. 12, 1967

3,357,650
TAPE RECORDER OPERATING DEVICE
Isuke Sato, Machida-shi, Tokyo, Japan, assignor to Memofon Company, Limited, Tokyo, Japan, a corporation of Japan
Filed Oct. 18, 1965, Ser. No. 496,877
Claims priority, application Japan, June 21, 1965, 40/37,168
2 Claims. (Cl. 242—55.12)

ABSTRACT OF THE DISCLOSURE

An improved operating device for a tape recorder comprises first and second supporting plates, and a direct current motor mounted on said first supporting plate and having its rotary shaft in contact with a rubber tire on a rotatable disc. The disc, rotatably supported on said first supporting plate, is provided with a rotatable shaft on which latter is mounted a capstan. A bar, serving to incline the rotary shaft of the D.C. motor, has a projection which is adapted to engage a first lever pivotally mounted on said second supporting plate. An electric switch, opened and closed by a contact piece, is operatively associated via a cam with a spring-loaded rod from which latter extends a projection which is adapted to engage said bar projection. The cam is adapted operatively to connect the projections on the bar and the rod with the contact piece, so that when the cam is rotated clockwise or counerclockwise the switch is closed and the shaft of the motor is brought into contact with the rubber tire, whilst when the cam is rotated counterclockwise and the spring-loaded rod is depressed recordation of sound is made possible.

This invention relates to tape recorder operating devices.

Required operations of a tape recorder are at least recording and reproducing sounds and reversing the tape. Heretofore, it has been necessary to operate many such parts as switches, handles and levers, and there has been a defect that the operation is troublesome.

A principal object of the present invention is to provide a tape recorder operating device wherein the above mentioned defect is eliminated, and recording and reproducing sounds and reversing the tape can be effected by very simple operations.

Figure 4A:
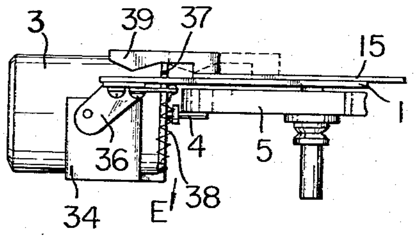
Figure 4B:
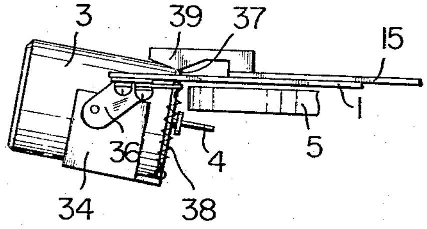

FIG. 4(*a*) and FIG. 4(*b*) show in fragmentary detail relations between a motor and a rubber tire; FIG. 4(*a*) showing the rotary shaft of the motor in contact with the rubber tire, and FIG. 4(*b*) showing them separated from each other.

Figure 5A:
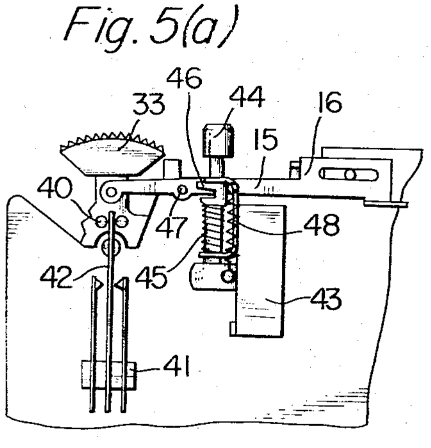
Figure 5B:
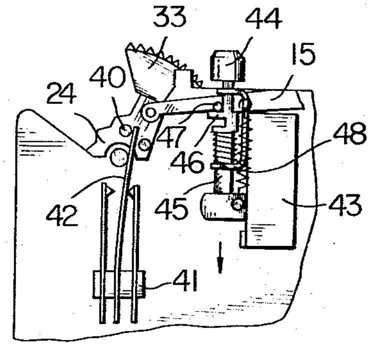

FIG. 5(*a*) and FIG. 5(*b*) show in fragmentary detail the positions of a sound recording button, FIG. 5(*a*) showing the button in a normal state and FIG. 5(*b*) showing it in a sound recording state.

The device of the present invention shall now be explained with reference to the drawings.

In the drawings, 1 is a first supporting plate and 2 is a second supporting plate. Most of the parts described below are pivoted on, or secured to the above mentioned first supporting plate 1 or second supporting plate 2. 3 is a direct current motor. 4 is a rotary shaft of said direct current motor. 5 is a rubber tire adapted to be in contact with the above mentioned rotary shaft 4. 6 is a capstan provided on the rotary shaft of the above mentioned rubber tire 5. 7 is a pinch roller. 8 is a V-shaped arm supporting the pinch roller rotatably at one end of said arm. 9 is a pivoting part for the above mentioned V-shaped arm and provided on the second supporting plate 2. 10 is a pin provided at the other end of the above mentioned V-shaped arm 8. 11 is a spring adapted to pull the above mentioned V-shaped arm. 12 is a pulley. A winding reel (not illustrated) is to be fitted on the shaft of said pulley 12. 13 is an auxiliary pulley fitted rotatably to one end of a first lever 14. The first lever 14 is rotatably fitted on the second supporting plate 2 and is engaged at its other end with a projection 16 of a bar 15. 17 is a spring adapted to pull the above mentioned first lever 14. 6' is a pulley provided in the base part of the above mentioned capstan 6. 18 is a rubber belt adapted to be in contact with the pulleys 12, 6' and 13.

19 is a roller. A feeding reel (not illustrated) is to be fitted on the shaft of said roller. 20 is a rubber roller pivoted to a lever 21 pulled by a spring 22 at one end and borne by a lever 23 at its other end. Said lever 23 is pivoted at one end thereof to the first supporting plate 1 and is engaged with a projection 25 of a cam 24 at its other end. Said cam 24 is rotatably mounted on the first supporting plate 1 and second supporting plate 2 by a shaft 26. A concave part 27 is made on the side of the cam 24. Said concave part 27 is so formed as to engage with an arcuate projection 29 of a lever 28 mounted rotatably at one end thereof to the first supporting plate 1 by a shaft 30 and pulled by a spring 31 a its other end. A projecting side 32 to engage with the pin 10 (or a roll instead of the pin) is made on the other side of the cam 24. 33 is a grip secured to the cam 24.

Figure 1:
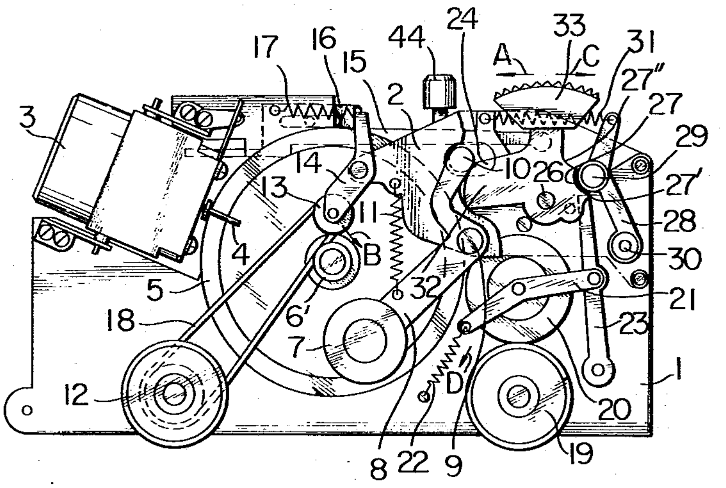
FIG. 1 is a plan view which illustrates an essential part of a tape recorder operating device according to the present invention.
Figure 2:
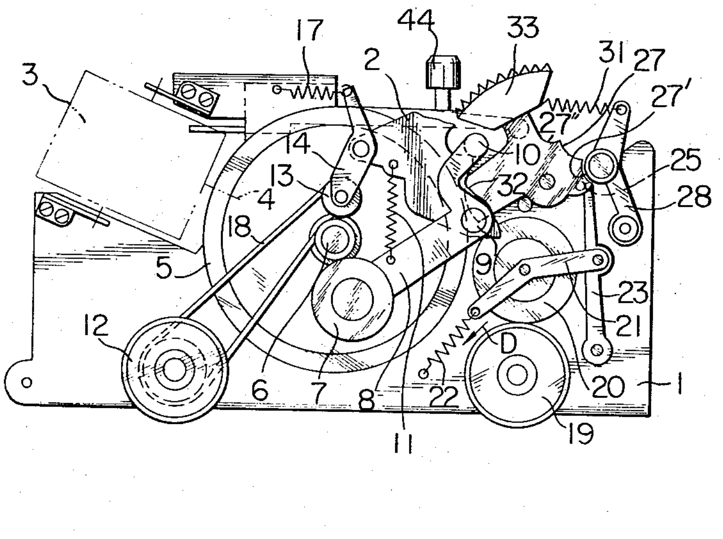
FIG. 2 is a plan view which illustrates the same part in a reproducing state.

The operation of the above mechanism shall be explained. Illustrated is a position in which the grip 33 is at a stop position. When the grip 33 is rotated in the direction indicated by the arrow "A," it will rotate anticlockwise in the drawing and the projection 29 will engage with the concave part 27'. (See FIG. 2.) The bar 15 will advance leftward in the drawing, whilst the lever 14 and the projection 16 of the bar 15 will be disengaged from each other; therefore, the lever 14 will be rotated, in the direction indicated by the arrow "B," by the spring 17; therefore, the rubber belt 18 will come into contact with the pulley 6', and thus the rotation of the motor 3 will be transmitted to the pulley 12 through the rubber tire 5 and the winding reel (not illustrated) will be rotated. Further, the pin 10 of the V-shaped arm 8 and the projecting side 32 of the cam 24 will be disengaged from each other and therefore the pinch roller 7 will be pulled upward by the spring 11 and will rotate in contact with the capstan 6.

Figure 3:
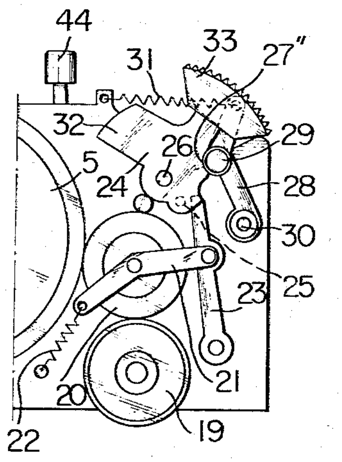
FIG. 3 is a plan view which illustrates the same part in an unwinding state.

Now, when the grip 33 is rotated in the direction indicated by the arrow "C," the cam 24 will rotate clockwise in the drawing and the projection 29 will engage with the concave part 27''. (See FIG. 3.) Therefore, the projection 25 of the cam 24 and the lever 23 will be disengaged from each other, and thus the lever 21 will be pulled in the direction indicated by the arrow "D" by the spring 22, the rubber tire 5, rubber roller 20 and roller 19 will come into contact with each other, the rotation of the motor 3 will be transmitted to the roller 19 through rubber tire 5 and rubber roller 20, and the feeding reel (not illustrated) will be rotated.

The relationships between the rubber belt 18 and pulley 12 and between the pulley 6' and auxiliary pulley 13 shall be explained. When the grip 33 is rotated in the direction indicated by the arrow "A," the rubber belt 18 will come into contact with the pulley 6' coaxial with the capstan 6 due to the resiliency of the spring 17. Then, when the grip 33 is kept in the state shown in FIGURE 2, the position of the engagement of the first lever 14 with the projection 16 will be moved slightly toward the grip 33 by the projection 16, the resiliency of the spring 17 will not act and the rubber belt 18 will be in contact with the pulley 6' with only its own elasticity and will therefore act to brake the pulley 12. Therefore, it is possible to prevent the winding reel from being rotated by vibration or the like and the tape from being unwound. When the grip 33 is rotated in the direction indicated by the arrow "C," the rubber belt 18 will completely separate from the pulley 6' and will lightly give a back tension to the pulley 12 with its tension so that the tape may be wound up with a proper pressure when it is to be unwound from the reel.

As described above, according to the present invention, by only rotating the grip 33 in the direction indicated by the arrow "A," the winding reel can be rotated and at the same time the pinch roller 7 can be brought into contact with the capstan 6. By returning the grip 33 to the original position, the pinch roller 7 can be returned to the initial position. By rotating the grip 33 in the direction indicated by the arrow "C," the feeding reel can be rotated and the tape can be reversed. Thus the operation is very simple.

The motor supporting mechanism shall now be explained. (See FIG. 4(*a*) and FIG. 4(*b*).) The motor 3 is secured within a case 34. A shaft 35 is provided projecting on each side of said case 34 and is rotatably supported by a supporting plate 36. A projection 37 is provided at one end of the case 34 and is kept in contact with an angular part 39 on one side of the bar 15 by a spring 38. While the grip 33 stops in the middle position, as shown in FIG. 4(*b*), the higher part of the angular part 39 will be in contact with the projection 37, and therefore the rotary shaft 4 of the motor 8 will be lifted in the direction indicated by the arrow "E" and will be separated from the rubber tire 5. When the grip 33 is rotated in the direction indicated by the arrow "A" or "C" as in FIG. 4(*a*), the projection 37 of the case 34 of the motor 3 will come into contact with the lower part of the angular part 39 of the bar 15 and will be pulled by the spring 38, and the rotary shaft 4 will come into contact with the rubber tire 5 and will be able to transmit the rotation of the motor to the rubber tire.

The electric contact opening and closing mechanism shall now be explained. (See FIG. 5(*a*) and FIG. 5(*b*).) Two projections 40 are provided on the cam 24. A contact piece 42 of a switch 41 is inserted between said projections 40. Therefore, when the cam 24 is rotated clockwise or anticlockwise, the contact piece 42 will be moved rightward or leftward and an electric source thereby will be opened or closed.

Further, 43 is a switch for recording sounds. When a button 44 is pushed downward as indicated by the arrow (see FIG. 5(*b*)), the switch 43 will be closed and will be in a sound recording state. For this purpose, the button 44 is provided with a rod 45. A projection 46 is provided on the side of said rod 45. The bar 15 is also provided with a projection 47. Thus, when the button 44 is pushed and the grip 33 is pushed in the direction indicated by the arrow "A," the lower side of the projection 46 will engage with the projection 47 of the bar 15 and the rod 45 will be prevented from returning to the original position and will be kept in a sound recording state. 48 is a spring for returning the rod 45. By merely returning the grip 33, the rod 45 in the sound recording state can be released from the sound recording state.

According to the present invention, as described above, by merely rotating the grip 33 in the direction indicated by the arrow "A" or "C," the electric source switch can be opened or closed. In order to record sounds, the button 44 may be pushed and the grip 33 may be rotated in the direction indicated by the arrow "A." Thus, sounds can be recorded by a very simple operation. When the grip 33 is merely rotated in the direction indicated by the arrow "A" without pushing the button 44, reproduction only can be made. Therefore, the present invention has an effect of simplifying the handling operation.

What is claimed is:

1. A tape recorder operating device comprising a motor having a rotary shaft; a rubber tire having a rotary shaft and adapted to be in contact with said rotary shaft of said motor; a pulley and capstan provided on said rotary shaft of said rubber tire; a pinch roller mounted to be in contact with said capstan; a V-shaped arm pivoting said pinch roller; a second pulley for receiving and rotating a tape winding reel; a third pulley mounted on the rotary shaft of the rubber tire; an auxiliary pulley; a first lever pivoting said auxiliary pulley, a belt adapted to connect said second and third pulleys and said auxiliary pulley; a roller rotating a tape feeding reel; a rubber roller mounted so as to be free to contact with said roller and with said rubber tire; a second lever adapted to pivotally move said rubber roller, a cam manually operable; a third lever connected to said second lever and adapted to be in contact with said cam; and a bar operatively connecting said cam and first lever with each other.

2. A tape recorder operating device comprising a direct current motor; a supporting plate rotatably supporting said direct current motor, said motor having a rotary shaft; a rubber tire; said rotary shaft being adapted to connect with said rubber tire; a bar to incline the rotary shaft of said motor; a switch for recording sounds; said switch including a spring-biased rod having a projection thereon; said rod projection being free to engage with a projection of said bar; an electric source switch; a contact piece to open and close said electric source switch; and a cam to operatively connect the projections of said bar and rod and the contact piece so that, when said cam is rotated clockwise or anticlockwise, the electric source switch may be closed and the motor may be brought into contact with the rubber tire and, when said spring-biased rod is pushed and the cam is rotated anticlockwise, a sound recording state may be maintained.

References Cited

UNITED STATES PATENTS

| | | | |
|---|---|---|---|
| 2,983,794 | 5/1961 | Shields | 242—55.12 |
| 3,050,225 | 8/1962 | Ulman | 242—55.12 |

LEONARD D. CHRISTIAN, *Primary Examiner.*